United States Patent
Saifee et al.

(10) Patent No.: US 11,830,041 B2
(45) Date of Patent: Nov. 28, 2023

(54) SYSTEM AND METHODS FOR GENERATING DYNAMIC MARKET PRICING FOR USE IN REAL-TIME AUCTIONS

(71) Applicant: OpenX Technologies, Inc., Pasadena, CA (US)

(72) Inventors: Qasim Saifee, Northridge, CA (US); Michael Todd, Santa Monica, CA (US); Timothy Roy Cadogan, Altadena, CA (US); David Ee Kwung Lapsley, Valencia, CA (US); Jeddy Chang Chen, Pasadena, CA (US); Eric Jongsang Kim, Glendale, CA (US); Anthony Frank Molinaro, Pasadena, CA (US); Joel Peter Meyer, Temple City, CA (US); Moira Regelson, Pasadena, CA (US)

(73) Assignee: OPENX TECHNOLOGIES, INC., Pasadena, CA (US)

( * ) Notice: Subject to any disclaimer, the term of this patent is extended or adjusted under 35 U.S.C. 154(b) by 0 days.

(21) Appl. No.: 17/107,252

(22) Filed: Nov. 30, 2020

(65) Prior Publication Data
US 2021/0118015 A1 Apr. 22, 2021

Related U.S. Application Data

(63) Continuation of application No. 13/971,762, filed on Aug. 20, 2013, now Pat. No. 10,853,848.
(Continued)

(51) Int. Cl.
*G06Q 30/0273* (2023.01)
(52) U.S. Cl.
CPC .............................. *G06Q 30/0275* (2013.01)

(58) Field of Classification Search
CPC .......................... G06Q 30/0275; G06Q 30/08
See application file for complete search history.

(56) References Cited

U.S. PATENT DOCUMENTS

| 7,133,848 B2 | 11/2006 | Phillips et al. |
| 8,095,429 B1 | 1/2012 | Gottlieb |

(Continued)

FOREIGN PATENT DOCUMENTS

WO    WO-2012012342 A2 *  1/2012 ............. G06Q 30/02

OTHER PUBLICATIONS

Perlick et al, Bid Optimizing and Inventory Scoring in Targeted Online Advertising, , Aug. 12-16, 2012, KDD'12 p. 804-812 (Year: 2012).*

(Continued)

*Primary Examiner* — Marie P Brady
(74) *Attorney, Agent, or Firm* — PATENT LAW WORKS LLP

(57) ABSTRACT

A system and methods for generating dynamic market pricing that is fair for both publishers and advertisers and the use of the pricing in real-time auctions. When a user views content over the internet, an online publisher provides content to the user with executable instructions, which notify an advertisement source that there is an impression for filling by an advertiser. The impression is submitted to a real-time bidding market for competing advertisers to bid to fill the impression with an advertisement. The system and methods generate dynamic pricing for the individual competing advertisers and use the dynamic pricing to compare advertiser bids to determine a highest or winning bid and a clearing price associated with the highest or winning bid.

19 Claims, 13 Drawing Sheets

Related U.S. Application Data

(60) Provisional application No. 61/684,811, filed on Aug. 20, 2012.

(56) References Cited

U.S. PATENT DOCUMENTS

| | | | |
|---|---|---|---|
| 8,204,821 B2 | 6/2012 | Staib et al. | |
| 9,076,166 B1* | 7/2015 | Peretz | G06Q 30/0277 |
| 10,157,387 B2* | 12/2018 | Cunningham | G06Q 30/02 |
| 2003/0195832 A1* | 10/2003 | Cao | G06Q 40/04 |
| | | | 705/37 |
| 2003/0225677 A1* | 12/2003 | Sandholm | G06Q 30/08 |
| | | | 705/37 |
| 2006/0242017 A1 | 10/2006 | Libes et al. | |
| 2006/0294084 A1 | 12/2006 | Patel et al. | |
| 2009/0164298 A1* | 6/2009 | Gluhovsky | G06Q 30/08 |
| | | | 705/14.54 |
| 2010/0145809 A1* | 6/2010 | Knapp | G06Q 30/08 |
| | | | 705/14.71 |
| 2011/0040617 A1 | 2/2011 | Moonka et al. | |
| 2011/0173126 A1* | 7/2011 | Knapp | G06Q 30/02 |
| | | | 705/14.71 |
| 2011/0184802 A1 | 7/2011 | Ieong et al. | |
| 2011/0270701 A1* | 11/2011 | Black | G06Q 30/08 |
| | | | 705/26.3 |
| 2012/0041816 A1* | 2/2012 | Buchalter | G06Q 30/0242 |
| | | | 705/14.71 |
| 2012/0158522 A1 | 6/2012 | Nazer Zadeh et al. | |
| 2012/0179549 A1 | 7/2012 | Sigmund et al. | |
| 2012/0284137 A1* | 11/2012 | Beckham | G06Q 30/08 |
| | | | 705/26.3 |
| 2103/0097028 | 4/2013 | Han et al. | |
| 2014/0006170 A1* | 1/2014 | Collette | G06Q 30/0277 |
| | | | 705/14.71 |

OTHER PUBLICATIONS

International Search Report and Written Opinion for International Application No. PCT/US2013/055876, dated Dec. 13, 2013, 13 pgs.
Reisinger et al., "Pricing Externalities in Real-Time Bidding Markets," 24th Annual Conference on Neural Information Processing Systems, Dec. 10, 2010, pp. 26-31.

* cited by examiner

Example Bid information

1. Total number of bids submitted to broker
2. Inventory floor price
3. Bidder information (account id and bid price)

Figure 6

Example Bid Context 1. user information (e.g., user agent type, operating system, etc.)
2. publisher information (e.g., site, static floor price, etc.)
3. advertiser information (e.g., category, brand, etc.)
4. system information (e.g., browser, hardware, operating system, etc.)

Figure 7

SYSTEM AND METHODS FOR GENERATING DYNAMIC MARKET PRICING FOR USE IN REAL-TIME AUCTIONS

CROSS REFERENCE TO RELATED APPLICATIONS

This application is a continuation of U.S. application Ser. No. 13/971,762, titled "System and Methods for Generating Dynamic Market Pricing for Use in Real-Time Auctions," filed Aug. 20, 2013, which claims priority under 35 USC § 119(e) to U.S. Application No. 61/684,811, titled "System and Methods for Generating Dynamic Market Floor Pricing for Publishers and its Use in Real-Time Auctions" filed Aug. 20, 2012, the entireties of which are herein incorporated by reference.

BACKGROUND

1. Field of the Invention

The present invention relates to systems and methods for conducting auctions. In particular, the present invention relates to generating a dynamic market floor with discrete pricing computations for publisher content for use in real-time auctions. More particularly, the dynamic market floor determines publisher market floor prices, based at least in part on, real-time and historical auction data, disseminates the prices, and applies them to the real-time auctions.

2. Description of the Related Art

With the popularity and use of the Internet, web browsers and sites providing content have grown dramatically over the past decade. With this growth, there has been an equally dramatic growth and migration to online advertising. However, online advertising presents a complex eco-system involving a complicated interplay between several entities, including online publishers, online advertisers (both informed and uninformed), and users who browse the internet to view all types of content.

Online advertising typically uses modeling platforms that use impressions, impression values (intrinsic, i.e., value to an "advertiser" and value to a "publisher" of content), estimated impression values, and inventory of content. Impression values include intrinsic values, which are values of advertising inventory to advertisers and publishers. Estimated impression values include values of advertising inventory to publishers and advertisers (both informed and uninformed).

Until now, many schemes that benefit advertisers exits. However, there are myriad challenges faced by publishers in this complex eco-system. First, it is difficult for internet publishers to accurately value their inventory (of online advertising impressions). Second, a subset of internet advertisers, who often devote considerable resources to understanding the value of user impressions have a competitive advantage over other advertisers and publishers setting floors, which allows them to more accurately value page impressions. Third, real-time bidding ("RTB") auctions allow advertisers to compete in real-time for publisher impressions. Often, in these types of auctions, the final "clearing price" for an impression is based on the second highest bidder and a "static" floor price that is set by the publisher associated with the impression. Yet, in many instances, the publisher associated with the impression sets the static floor price, with little or no knowledge of its value, as a result of which that static floor price is typically too low and unfair to the publisher. Fourth, an informed advertiser may bid on an impression in two situations. For example, in a first situation, where the only competing bids are from uninformed advertisers. And, in a second situation, where the publisher has not accurately assessed the value of the impression. In either situation, it is possible and often likely, that the informed bidders will pay significantly less than they would have been prepared to pay because the second bid received and the publisher floor price are both often too low.

To avoid unfair pricing for publishers, there is a clear need for publishers to be able to automatically and accurately value their impression inventory in real-time in order to protect themselves from informed advertisers in the RTB market place. Yet, it is only fair for advertisers to be charged a fair price. Existing solutions do not adequately address this dire need for publishers to be able to automatically and accurately value their impression inventory to protect themselves from informed advertisers in the RTB market place and for advertisers to be charged a fair price in the same scenario. In this scenario, a representative sample of competition may not be available at all times (for example, in some instances, there may only be a single bidder). In such instances, determining a "fair price or a fair market value" may not be possible. It should be recognized that the fair market value is the value/price at which an auction should clear at, in the event the complete bid landscape from individual demand sources are realized per auction. This may include bids, which advertisers do not send to an RTB market when they consolidate their bids that may be conducted across different brands (defined as the actual product being sold). In some instances, consolidation of bids may also be conducted by demand side platforms ("DSPs"), where bids from different advertisers are aggregated prior to reaching the RTB marketplace.

SUMMARY

The present invention overcomes the deficiencies and limitations of prior systems and methods, at least in part by, providing a system and methods for determining dynamic prices (for publishers and advertisers) based on real-time and historical auction data, disseminating those prices, and applying them to real-time auctions.

In some implementations, the system and methods generate dynamic market pricing (in some instances, "floor" pricing when used as a threshold) for publishers and advertisers and use of that pricing in real-time auctions. The term "advertiser" as used here includes an individual advertising entity interacting directly (for a brand) with a RTB platform as well as a demand-side platform interacting indirectly with a RTB platform, where bids from various competing advertisers are aggregated. When a user views content over the internet, an online publisher provides content to the user with executable instructions, which notify an advertisement source that there is an impression for filling by an advertiser. The impression is submitted to a real-time bidding market for competing advertisers to bid to fill the impression with an advertisement. The system and methods of the present technology generate dynamic pricing (e.g., floor price) for individual competing advertisers and use the dynamic pricing (e.g., floor price) to compare advertiser bids to determine a highest or winning bid and a clearing price associated with the highest or winning bid. It should be recognized that the term "floor" as used in this application, does not refer only to a threshold pricing, but also to a valuation, pricing, outcome of a modeling platform, etc.

In some implementations, a method for determining publisher fair prices for content viewed by users over the internet, comprises operations by one or more computing devices for 1) receiving a request from a consumer at a publisher's server for content; 2) providing the content from a publisher to the user with executable instructions; 3) notifying one or more advertisement sources that there is an impression for filling by an advertiser; 4) conducting real-time bidding operations relating to the impression for competing advertisers to bid to fill the impression with an advertisement; 5) receiving a plurality of bids from the competing advertisers to fill the impression with their advertisements; and 6) determining dynamic prices for each of the competing advertisers (in some instances, dynamic floors) and using the dynamic prices with advertiser bids to determine a highest bid (in some instances, a winning bid) and a clearing price associated with the highest (or winning) bid. In some implementations, the methods may include 7) determining if the winning bid is too low, and in the event that the winning bid is not too low, allowing the auction to clear, and in the event that the winning bid is too low, not permitting the auction to clear. In some implementations, a system for determining fair prices (for publishers and advertisers) for content viewed by users over the internet comprises a processor and a memory storing instructions that, when executed, cause the system to: 1) receive a request from a consumer at a publisher's server for content; 2) provide the content from a publisher to the user with executable instructions; 3) notify one or more advertisement sources that there is an impression for filling by an advertiser; 4) conduct real-time bidding operations relating to the impression for competing advertisers to bid to fill the impression with an advertisement; 5) receive a plurality of bids from the competing advertisers to fill the impression with their advertisements; and 6) determine dynamic prices (in some instances, floor prices) for each of the competing advertisers and using the dynamic prices with advertiser bids to determine a highest or winning bid and a clearing price associated with the highest or winning bid. In some implementations, the system may 7) determine if the highest or winning bid is not too low, and in the event that the highest or winning bid is not too low, allowing the auction to clear, and in the event that the highest or winning bid is too low, not permitting the auction to clear.

The system and methods disclosed below can be advantageous in a number of respects. The present invention is particularly advantageous because it enables internet publishers to value their inventory and receive fair pricing. They provide a mechanism to provide accurate, per-advertiser floor prices to protect the publishers in situations that are typically favorable to the advertisers. Generally, advertisers often invest a considerable amount of resources and time in determining the pricing of impressions that they are targeting. Advertisers often use third party data resources in the valuation process. By obtaining this additional information, advertisers can value an impression more accurately than their competitors and/or the publisher. This can result in differential bidding, where some advertisers are willing to pay much more than others. This often results in publishers receiving much less for their inventory than advertisers are willing to pay.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 6 illustrates an example bidding related information generated upon receiving advertiser's bids in an auction.

FIG. 7 illustrates example bid context information generated when an auction has completed.

DETAILED DESCRIPTION

Figure 1:
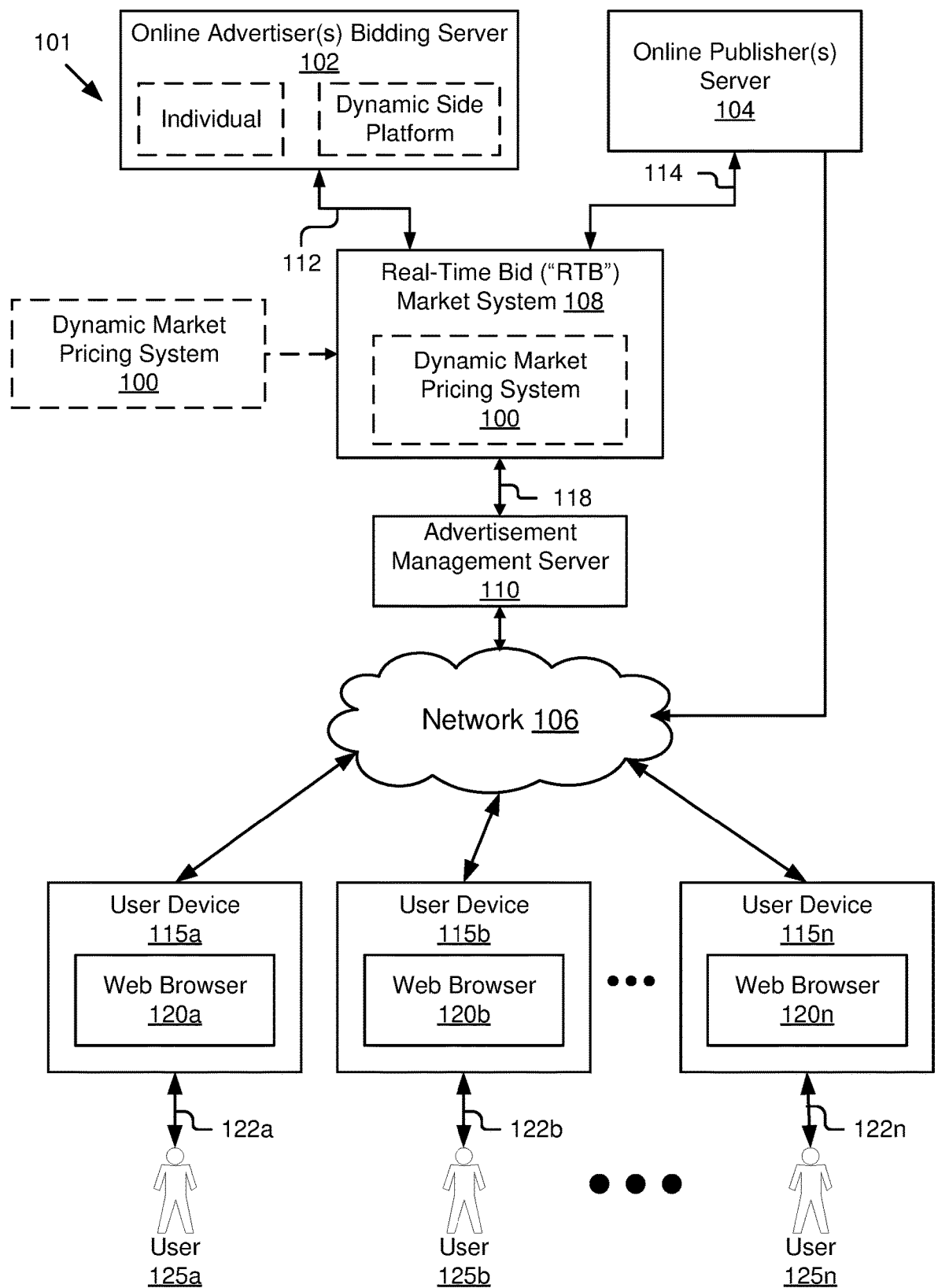
FIG. 1 is high-level block diagram illustrating an example dynamic market pricing system, system architecture, and an example environment in which the system operates according to some implementations of the present technology.

A system and methods for generating dynamic floor prices for publishers, disseminating them, and applying them to real-time auctions are described. The system architecture of the present technology includes a dynamic market floor pricing platform, which formulates time varying, discrete market pricing for multiple individual advertisers.

In the following description, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Figure 1A:
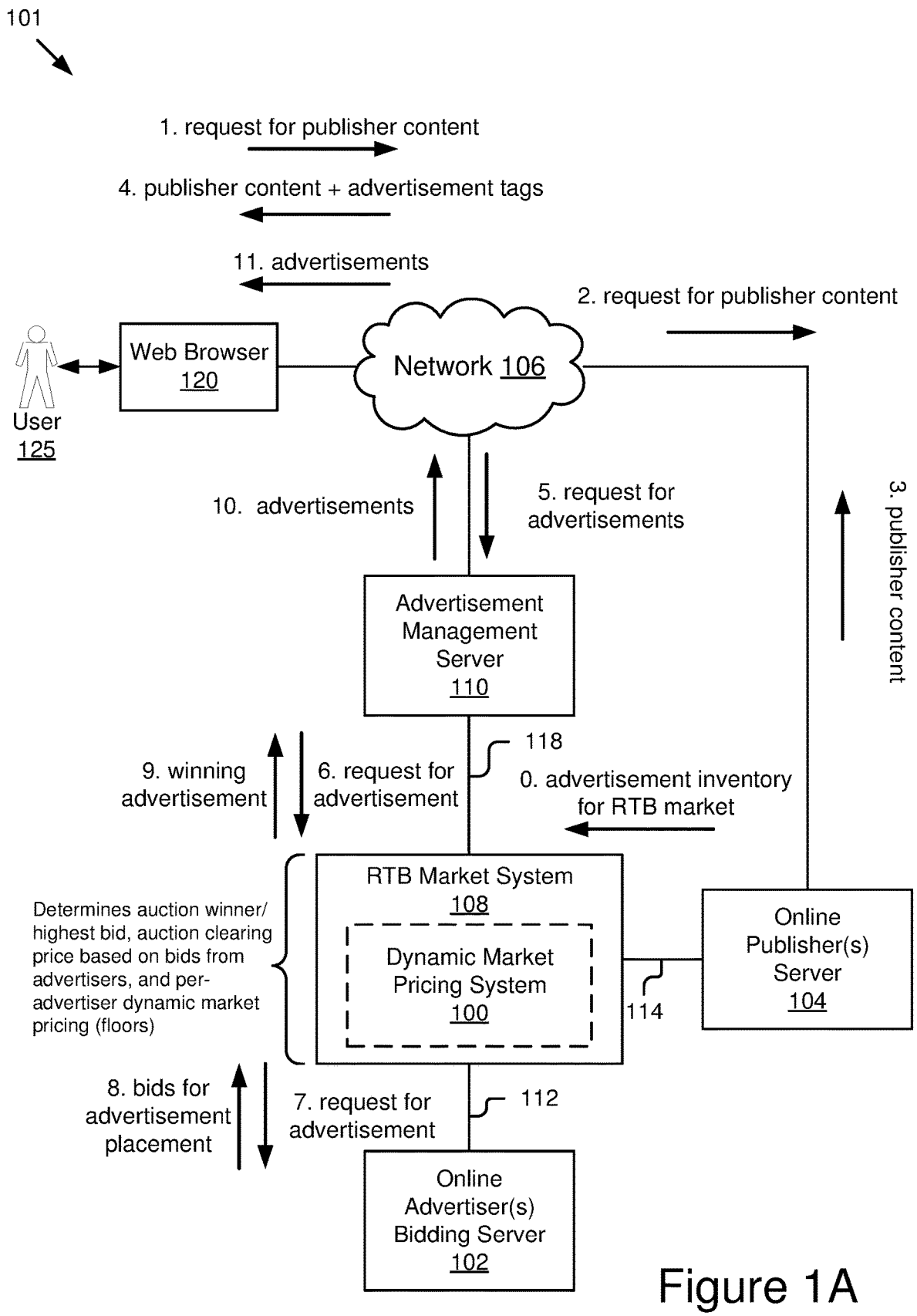
FIG. 1A is a high-level block diagram illustrating an example environment in which the dynamic market pricing system operates.

FIGS. 1 and 1A illustrate block diagrams of an example dynamic market pricing system 100 illustrated generally in an environment 101 in which the present technology is operable. The environment 101 as illustrated includes: an online advertiser bidding server or site 102 (representing one or more online advertisers), an online publisher content server or site 104 (representing one or more online publishers), a network 106, and a real-time bidding ("RTB") market system 108. The online advertiser bidding server 102 may be a computing system, including one or more computers arranged in a distributed architecture or otherwise, which is configured to submit bids to the RTB market 108 to purchase publisher inventory and have advertisements provided by advertisers displayed on a publisher's site. The online publisher content server 104 may be a computing system, including one or more computers arranged in a distributed architecture or otherwise, which is configured to maintain online content that attracts users and contains placeholders for advertisement inventory that are submitted to the RTB market, for sale to advertisers to place their advertisements. The RTB market system 108 may be a computing system, including one or more computers, arranged in a distributed architecture or otherwise, that provide a real-time bidding market scenario that allows advertisers to bid on publisher inventory in real-time. Although only a single advertiser bidding server 102, a single online publisher content server 104 and a single network 106 are shown in FIGS. 1 and 1A, it should be recognized that there may be thousands or even millions of advertiser bidding servers 102 (representing online advertisement vendors), publisher content servers 104, or networks 106. FIGS. 1 and 1A are merely provided for purposes of illustration of the systems 102, 104, and network 106, which present the general environment in which the present technology may be implemented.

The advertiser bidding server 102 is coupled by signal line 112 for communication with the real-time bidding market system or platform 108. Although not explicitly shown in FIG. 1A, it should be recognized that any and all the signal lines illustrated in FIG. 1A may route, via the network 106, as illustrated in FIG. 1. The online advertiser bidding server 102 is coupled to the real-time bidding market 108 to send bids on impressions, and also provides advertisement content, advertising target information, price, or any other information related to the impression or necessary to serve the ad. The RTB market 108 is a real-time bidding market system or platform, which allows advertisers to bid on publisher inventory in real-time.

The online publisher server or content site 104 represents a computing device (one or more) for hosting a website with any type of content for publishing. The signal line 114 provides information to the RTB market system 108 about which impressions on the publisher's site are available for the RTB market. A control line from 104 to 106 indicates content provision from the online publisher content servers.

The network 106 may be of a conventional type, wired or wireless, and may have any number of configurations such as a star configuration, token ring configuration or other configurations known to those skilled in the art. In some implementations, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The RTB market system or platform 108 is coupled by signal line 118 to an advertisement management server 110 (also referred to herein as ad management server 110), which serves ads. The ad management server 110 may be software that receives requests for ad units, submits, and then fulfills those requests with online content. The ad management server 110 is coupled to the network 106 for communication and interaction with online advertisers bidding server 102 and the online publisher content site 104. A user 125 who is browsing the web is a potential customer or consumer of advertisements. There may be any number of users 125a, 125b, through 125n, who are coupled via the network 106 to online publisher sites 104. For example, when a user (125a-125n) navigates to a web page that is supplied by an online publishing content site 104 using the dynamic market pricing system 100, requests are sent to the online publishing content site 104 (the publisher's server) for content. The user navigates to a web page via a web browser 120. The browser may be any one of Chrome, Safari, Firefox, Internet explorer or the like.

The online publishing content server or site (publisher) 104 serves the content, which includes executable javascript tags. Once these tags are loaded in the user's web browser 120 (a-n) illustrated within user devices 115a through 115n, they are executed and notify the ad management server 110 that there is an impression that requires filling. The impression is then submitted to the Real-Time Bidding (RTB) market system or platform 108, where advertisers bid to fill the impression with their advertisements. The RTB market 108 reads in the dynamic floors for each of the competing advertisers and uses these floors, along with the advertiser bids, to determine the winner of the auctions and their clearing price. In the event that all of the received bids are too low, the Auction may be configured to not clear or otherwise indicate the situation.

The user (alternatively referred to as a consumer, client, or viewer) device 115a is representative of user devices 115a-115n and is a conventional type of computing device, for example, a personal computer, a hardware server, a laptop computer, a tablet computer, or smart phone. The user devices 115a-115n (also referred collectively and individually herein as 115) are illustrated, as coupled to the network 106. In one embodiment, the user device 115 (e.g., 115a) is coupled to receive online advertisements from the ad management server 110 and other content from publishing sites such as the publishers server 104. The user device 115 (e.g., 115a) includes a web browser 120 (e.g., 120a) for presenting online content and advertisements to the user 125 (e.g., 125a). The web browser 120a . . . 120n (also referred collectively and individually herein as 120) presents advertisements and other content, and receives input from the users 125a . . . 125n (also referred collectively and individually herein as 125) as represented by signal lines 122a . . . 122n. The web browser 120 is configured to provide access to a hosted web page. The web page may comprise a main area in which content is displayed and an advertisement. In some instances, the advertisement may be contained within an iframe.

Figure 2:
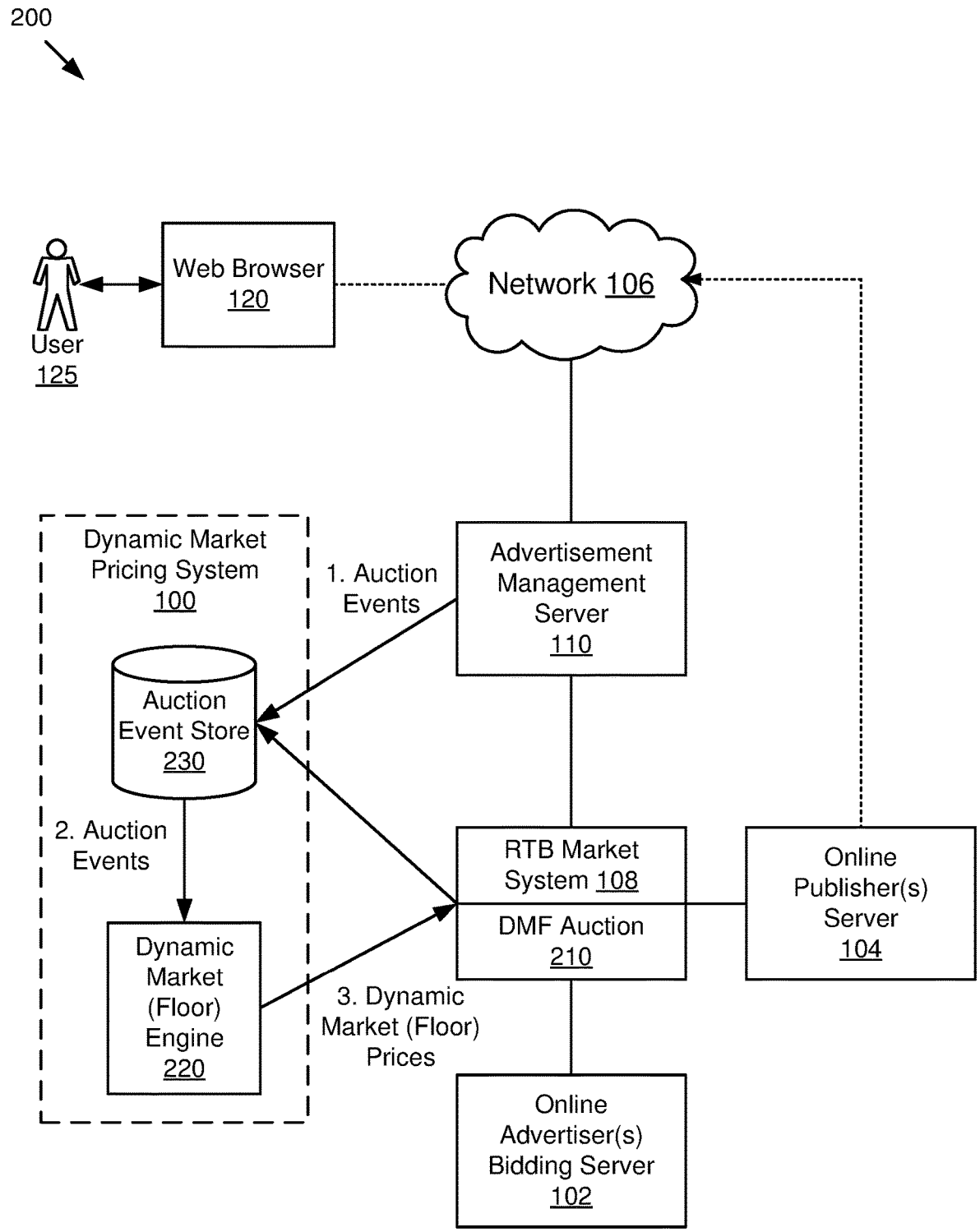
FIG. 2 is a high-level block diagram illustrating an example dynamic market pricing system including a dynamic market floor engine and auction event store configured to operate a dynamic floor auction.

The operations of the RTB market platform 108 are described in more detail below with reference to FIG. 2. Referring now to FIG. 2, the RTB market system or platform 108 implements a real-time bidding market scenario. In the implementations described here, the RTB market system or platform 108 conducts a dynamic market floor auction (e.g., dynamic market floor auction 210), which is a specialized auction that determines an auction winner, auction clearing price based on the bids submitted by advertisers, and per-advertiser dynamic market floors that are calculated and distributed by the dynamic market pricing system 100. In some implementations, the dynamic market pricing system 100 comprises an auction event store 230, which may include a large collection of computers arranged in a distributed, computational, and storage grid. The auction event store 230 may store events from the advertisement management server 110 (as indicated by the arrow from the advertisement management server 110 to the auction event store 230, with the indication "1. Auction Event") and RTB market system or platform 108 (as indicted by the arrow from the RTB market system or platform 108). Additional information on what data and/or entities are being stored in the auction event store 230 is described below with reference to at least FIG. 13. The dynamic market pricing system 100 further comprises a dynamic market floor engine 220 configured to determine and provide dynamic market floor prices (as indicated by the arrow from the dynamic market floor engine 220 to the DMF auction 210). In some implementations, the dynamic market floor engine 220 may be an analytics engine that processes 1) auction event data in real-time, near-real-time, or batch mode, 2) determines dynamic market floors based on this data, and 3) assesses the revenue impact of using these dynamic market floors compared to publisher "static" floors and/or other benchmarks.

Dynamic Market Pricing System 100

Figure 3:
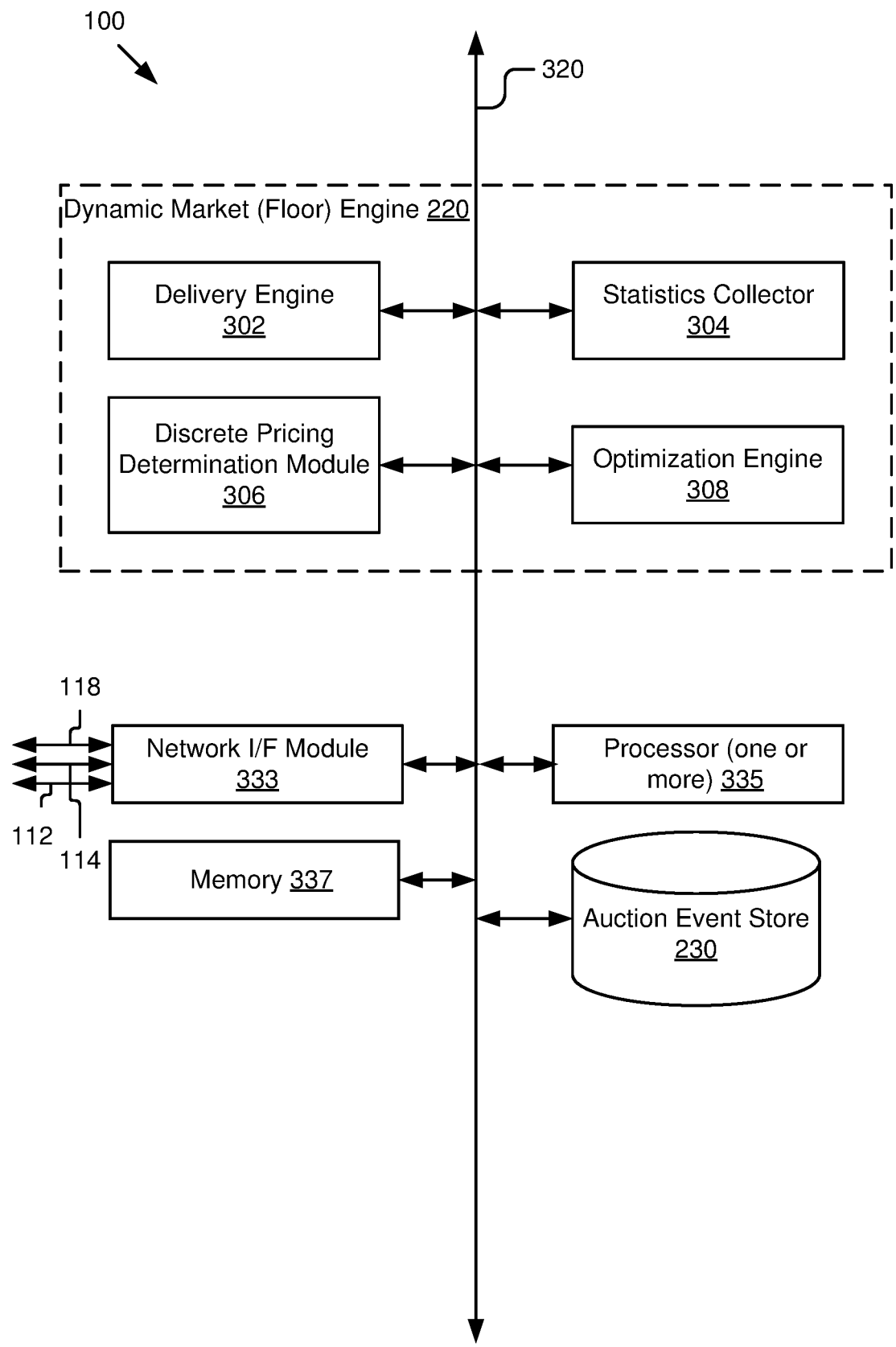
FIG. 3 is a block diagram illustrating an example dynamic market pricing system and its hardware components.

Referring now to FIG. 3, an example implementation of the dynamic market pricing system 100 is shown. This implementation of the dynamic market pricing system 100 includes a dynamic market floor engine 220 that comprises a delivery engine 302, a statistics collector 304, a discrete pricing determination module 306, and an optimization engine 308.

The delivery engine 302 is responsible for processing impressions for filling by advertisement. The delivery engine 302 is coupled for communication with the online publisher content servers (publisher sites) 104, via the signal line 114 (shown in FIG. 1), to receive advertisement requests and to serve advertisements. The delivery engine 302 may be configured to receive indirect requests, direct requests, and optimization information. The delivery engine 302 processes this information and selects a bid to be served as an advertisement. As noted above, in some implementations, the delivery engine 302 advantageously runs a modified second-bid auction to determine the winning bid. In yet other implementations, the delivery engine 302 advantageously may operate other types of auctions.

The statistics collector 304 is a module for storing and processing data (e.g. historical data, static floor data, etc.) pertinent to computing the dynamic market pricing (in some instances floor price). The statistics collector 304 is coupled to the delivery engine 302 to receive information regarding auction results, advertisement requests received, advertisements served, winning/losing bids, impression type, etc. The statistics collector 304 processes this information and stores it so that it is readily available for use by the discrete pricing determination module 306 and the optimization engine 308. The statistics collector 304 is coupled for communication with the discrete pricing determination module 306 and the optimization engine 308 by a bus 320. In some implementations, the statistics collector 304 stores the information in a plurality of formats including a real-time format, a near-term format, and a long-term format. In other implementations, the statistics collector 304 modifies the data in these formats as additional information is received from the delivery engine 302.

The discrete (per advertiser or otherwise) pricing determination module 306 may be software and routines for providing control information to the optimization engine 308. The discrete pricing determination module 306 computes effective floor prices (or base prices) based on predetermined criteria, for example, the dynamic floors values, overall minimum (a default price), second highest bidder, revenue amount for the entity operating the dynamic market pricing system, the static floor price etc. The discrete pricing determination module 306 may determine the relationship between the highest bid, and various discrete floors computed per advertiser.

The optimization engine 308 is software and routines for optimizing computations, for example, of revenue, based on comparing newly computed revenue amounts to previously computed revenue amounts.

The delivery engine 302, the statistics collector 304, the discrete pricing determination module 306, and the optimization engine 308 are modules coupled by bus 320 for communication and interaction with each other as well as the network interface module 333, processor 335, memory 337, and auction event store 230.

The network interface module 333 is coupled to network 106 by signal lines 118 (FIG. 1) and a bus 320. The network interface module 333 includes ports for wired connectivity such as but not limited to USB, SD, or CAT-5, etc. The network interface module 333 links the processor 335 to the network 106 that may in turn be coupled to other processing systems. The network 106 may comprise a local area network (LAN), a wide area network (WAN) (e.g., the Internet), and/or any other interconnected data path across which multiple devices may communicate. The network interface module 333 provides other conventional connections to the network 106 using standard network protocols such as TCP/IP, HTTP, HTTPS and SMTP as will be understood to those skilled in the art. In other embodiments, the network interface module 333 includes a transceiver for sending and receiving signals using WIFI, Bluetooth® or cellular communications for wireless communication.

The processor 335 comprises an arithmetic logic unit, a microprocessor, a general purpose controller or some other processor array to perform computations and provide electronic display signals to a display device. The processor 335 is coupled to the bus 320 for communication with the other components. The processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included as indicated by the notation "one or more." It will be obvious to one skilled in the art that other processors, operating systems, sensors, displays and physical configurations are possible.

The memory 337 stores instructions and/or data that may be executed by processor 335. The memory 337 is coupled to the bus 320 for communication with the other components. The instructions and/or data may comprise code for performing any and/or all of the techniques described herein. The memory 337 may be a dynamic random access memory (DRAM) device, a static random access memory (SRAM) device, flash memory or some other memory device known in the art.

In one embodiment, the auction event store 230 stores data, information and instructions used by the delivery engine 302, the statistics collector 304, the discrete pricing determination module 306, and the optimization engine 308. The auction event store 230 may be a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The auction event store 230 may be coupled by the bus 320 for communication with other components of the RTB market system or platform 108. Additional information on data and/or entities being stored in the auction event store 230 is provided below with reference to at least FIG. 13.

One or more of the delivery engine 302, the statistics collector 304, the discrete pricing determination module 306, and the optimization engine 308 are software or routines executable on the processor 335. In some implementations, one or more of the delivery engine 302, the statistics collector 304, the discrete pricing determination module 306, and the optimization engine 308, when executed by the processor 335, causes the collectors/modules to perform the operations described below. In yet other implementations, one or more of the delivery engine 302, the statistics collector 304, the discrete pricing determination module 306, and the optimization engine 308 are instructions executable by the processor 335 to provide the functionality described in the flow charts that follow. In still other implementations, one or more of the delivery engine 302, the statistics collector 304, the discrete pricing determination module 306, and the optimization engine 308, are stored in the memory 337 and are accessible and executable by the processor 335.

Figure 4:
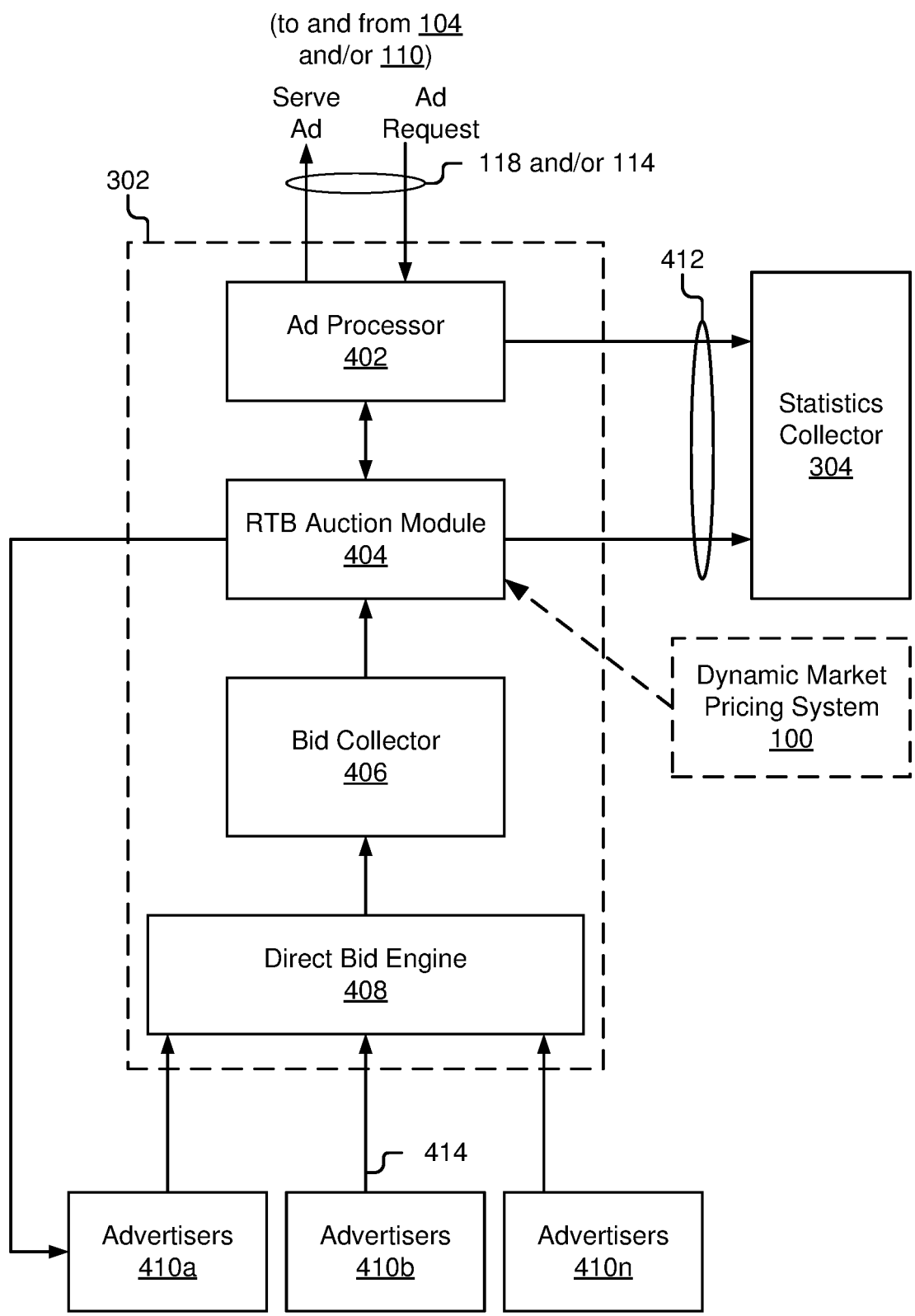
FIG. 4 is a block diagram representation illustrating an example dynamic floor auction platform, according to some implementations of the present technology.

Referring now to FIG. 4, an example implementation of the delivery engine 302 is described. In this implementation, the delivery engine 302 comprises an advertisement processor 402, an RTB auction module 404, a bid collector 406, and a direct bid engine 408.

The ad processor ("Ad processor") 402 handles the technical mechanics of receiving an advertisement request, requesting an advertisement to send in response, and serving an advertisement in response to the received advertisement request. The operation of the advertisement processor 402 is described for handling a single advertisement request; however, it should be recognized that the advertisement processor 402 can be scaled to handle thousands or millions of advertisement requests. The advertisement processor 402 is coupled to a signal line 118 and/or 114 to receive an advertisement request. The advertisement processor 402 is also coupled to a signal line 412 to serve advertisements to the statistics collector 304 and/or one or more modules of the dynamic market floor engine 220. In the simplest case, the advertisement processor 402 receives an advertisement request and stores information about the advertisement request. For example, the information stored includes the source of the advertisement request, the site of the advertisement request, information about advertisement placement and other metrics. The advertisement processor 402 then issues a request to the auction module 404 for an advertisement to be served in response to the advertisement request. In response, the auction module 404 returns an advertisement to be served. The advertisement processor 404 serves the received advertisement and records information about the serving of the advertisement. The advertisement processor 402 also outputs on the signal line 412 information about: 1) the advertisement request; 2) the advertisement that was served; 3) the serving of the advertisement; and 4) any error information about the serving of the advertisement. The advertisement processor 402 outputs this information to the statistics collector 304.

The RTB auction module 404 performs an auction as is described in more detail below and as a result of the auction identifies an impression. As has been described above, the advertisement identified as a result of the RTB auction is sent to the advertisement processor 402 so it can be served in response to the advertisement request. The RTB auction module 404 is coupled to the bid collector 406 to receive bids in response to any advertisement request that is received from the advertisement processor 402. The auction module 404 also records information about the auction such as the highest bidder, the second-highest bidder, information about the bids, information about the prices and various other metrics related to the auction. This information is output on signal line 412 to the statistics collector 304 for storage and use by other modules of the dynamic market pricing system 100.

The bid collector 406 is software and routines for gathering bids and sorting them for submission to the auction RTB module 404 in response to an auction. The dynamic pricing pricing market system 100 is coupled to the RTB auction module 404. The bid collector 406 has an input coupled to an output of the direct bid engine 408. The direct bid engine 408 receives bids from independent bidders or online advertisers (e.g., advertisers 410a, 410b, and 410n) via the online advertisers bidding server 102 (see FIG. 1).

The direct bid engine 408 generates bids based upon optimization information from the optimization engine 308. The direct bid engine 408 is advantageously adaptive in response to the information from the optimization engine 308. The directive bid engine 408 is used to generate bids based on requests received from users and/or online advertisers (e.g., advertisers 410a . . . 410n). The direct bid engine 408 advantageously generates bids with different prices based upon the information from the optimization engine 308. Depending on factors such as priority, pricing, availability provided by the optimization engine 308, the direct bid engine 408 generates bids and sends them to the bid collector 406 for consideration in the auction. The direct bid engine 408 is coupled to a signal line 414 to receive the information from the optimization engine 308 (not shown). The direct bid engine 408 has an output coupled to an input of the bid collector 406.

Figure 5:
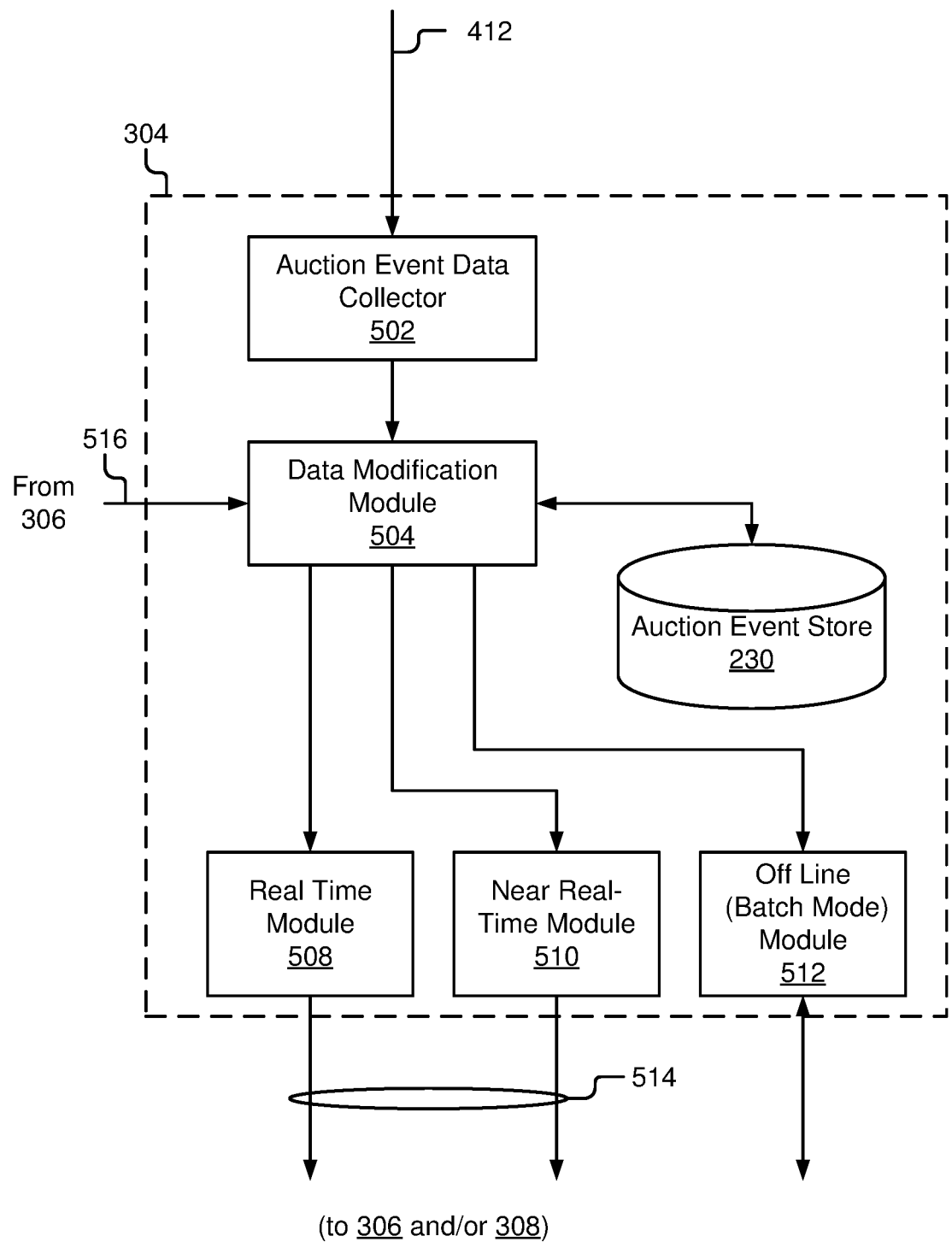
FIG. 5 is a block diagram representation illustrating example processes of collecting auction event data in either real-time, near real-time, or batch mode, according to some implementations of the present technology.

Referring now to FIG. 5, an implementation of the statistics collector 304 is described. In some implementations, the statistics collector 304 comprises an auction event data collector 502, a data modification module 504, the auction event store 230, which may be a database, a real-time module 508, a near-term module 510 and an off-line module 512.

The auction event data collector 502 is temporary storage for information received from the delivery engine 302 (FIG. 3) on the signal line 412. The auction event data collector 502 has an input to receive information from the delivery engine 302. Since the information is received from both the advertisement processor 402 and the auction module 404, this information is temporarily stored until it can be processed by the data modification module 504.

The data modification module 504 is responsible for processing and transferring information about impressions and the RTB auction from the auction event data collector 502. The data modification module 504 receives the information from the auction event data collector 502 and stores it immediately in the real-time module 508. The data modification module 504 continues to process the information and after some processing stores it in the near-term module 510. The output of the real-time module 508 and the near-term module 510 are provided on a signal line 514 to the discrete pricing determination module 306 (FIG. 3) and/or the optimization engine 308. These real-time and near-term modules 508, 510 are also responsive to requests for additional information from these modules 306 and 308. After additional processing, the information is stored in the off-line module 512. For example, information that is immediately available about advertisement calls, corresponding served advertisements and information about completed auctions may be stored in the real-time module 508. After additional processing by the data modification module 504, the specific advertisement request, corresponding served advertisement, and corresponding RTB auction performed to identify the advertisement are grouped together and stored in the near-term module 510. After yet further processing by the data processing module 504, additional information about whether the impression was actually delivered and presented or other information is added to the record and the information is moved to off-line module 512. The data modification module 504 is also coupled to a signal line 516 to receive corrections or modifications to the data from the discrete pricing determination module 306 (FIG. 3). Based on input information on signal line 516, the data modification module 504 modifies the information in the off-line (batch mode) module 512. In one embodiment, the off-line module 512 is accessible by APIs and other user interfaces and tools. The data modification module 504 also communicates with the auction event store 230 to store information related to each of the modules 508, 510 and 512.

Referring again to FIG. 2, during an RTB auction, the advertisement management server 110 and RTB market system 108 generate a number of events that include information about the context in which the RTB auction is occurring. FIG. 6 illustrates an example "event profile" (with the type of information available in the auction bids that are received) that is generated when all of the bids from the advertisers in an RTB auction have been received. This information is stored in the auction event store 230 (see FIG. 13).

FIG. 7 illustrates the information available in the "auction complete" event generated when an auction has completed. This information is stored in the auction event store 230 (see FIG. 13), which may include a large collection of computers arranged in a distributed, computational, and storage grid. The auction event store 230 in some implementations stores events from the advertisement management server 110 and the RTB market system 108.

In operation, the dynamic market pricing system 100 in conjunction with the RTB market system 108 conducts a dynamic market floor auction, which can utilize three separate algorithms, for performing identification, determining price, and conducting the dynamic market floor auction. The dynamic market floor auction may be a specialized auction. A dynamic market floor engine 220 determines and provides dynamic market floor prices. The dynamic market floor engine 220 can be an analytics engine that processes auction event data in real-time, near-real-time, or batch mode, determines dynamic market floors based on this data, and assesses the revenue impact of using these dynamic market floors compared to publisher "static" floors and/or other benchmarks.

The dynamic market pricing system 100 provides many benefits and advantages, including 1) automatically setting an optimal floor price across a publisher's entire inventory, 2) identifying advertiser contexts that are likely to represent informed bidding patterns and candidates for price optimization, 3) protecting publisher's inventory from informed bidders and illiquid markets; 4) supporting real-time, and non-real-time calculation of dynamic prices; and 5) providing a highly scalable mechanism for determining dynamic prices across large numbers of publishers, advertisers, sites, and large volumes of historical data.

Figure 8:
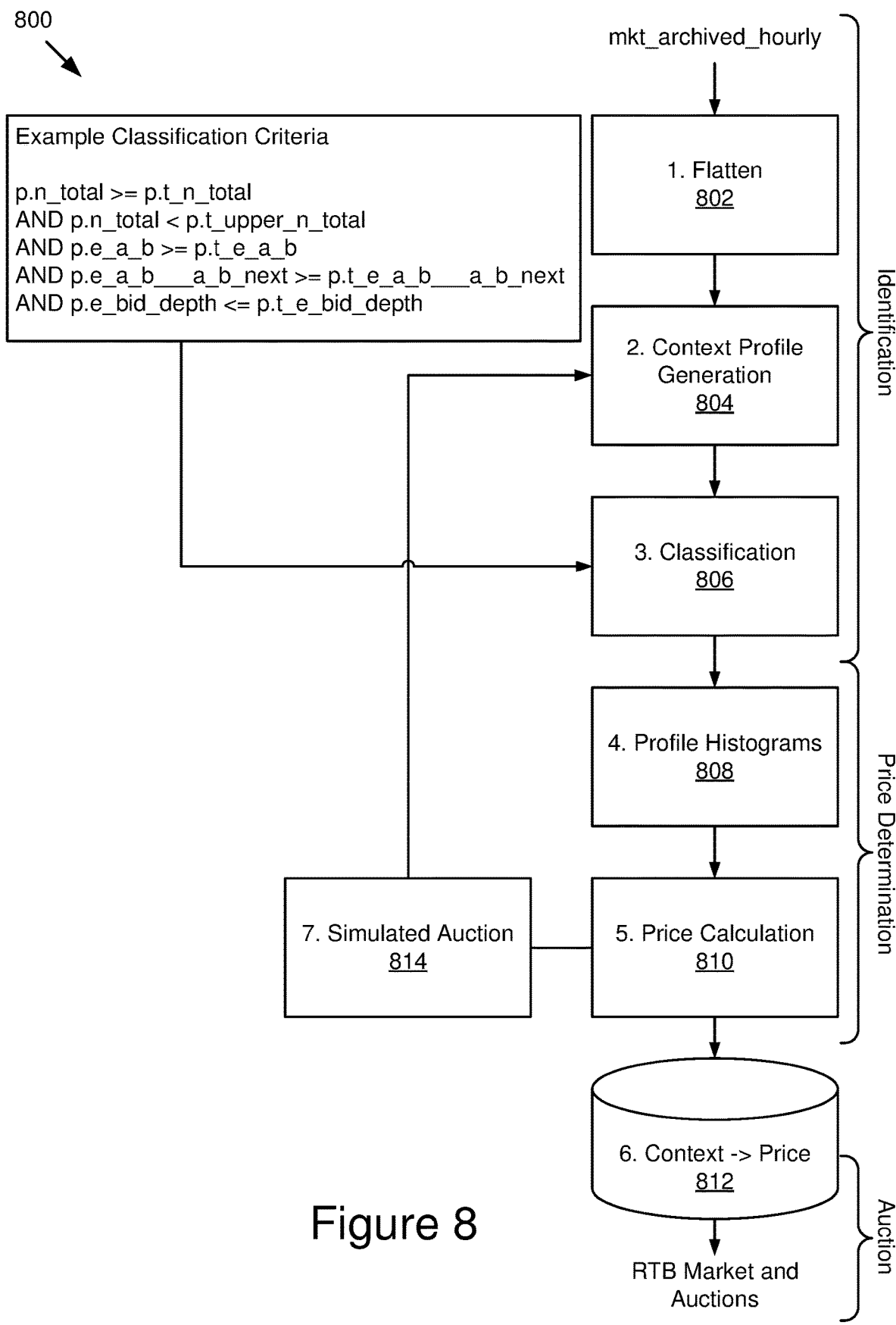
FIG. 8 is a flow chart illustrating an example algorithm utilized by the dynamic market pricing system for a bid event, which captures a particular bidder's bid information, and a partial context.

Referring now to FIG. 8, a high level view of the end-to-end data processing pipeline that occurs in the dynamic market floor engine 220 is described. Sections of the pipeline that correspond to the identification, price determination, and auction phases and algorithms are illustrated in the figure. The identification and pricing algorithms and phases are based on the concept of a "Context" and a "Context Profile." A "Context" specifies the environment surrounding a subset of a particular advertiser's bids. It is tracked using a "Context" identifier. A "Context" may be used to track a particular advertiser's bidding behavior. For example, a "Context" may be the advertiser's identification ("id") or the advertiser's identification ("id") concatenated with a specific brand, or the advertiser's id, brand, a publisher's site id, and a user's geography, and so on.

"Context Profiles" are summaries of an advertiser's behavior in relation to a specific "Context." They are generated by selecting all of the bidding events that match a particular "Context" and then generating summary statistics of the various metrics (usually statistical measures of various bidding event fields). The selection of variables for use from the "Context" and the metrics to include in a "Context Profile" are significant. These variables serve as filters.

Referring again to FIGS. 6 and 7, they show various fields available in an example event profile including the "context" of the auction bids received and an example profile of a complete auction event for identification and pricing. A subset of these may be selected for formulating "Context" and "Context Profile Metrics." In some instances, this may entail the use of a subset of a particular advertiser's bids for a specific set of context features or a model based on all features from contexts. In some example implementations, the following "Context Types" may be used:

Context Types based on advertiser attributes (e.g., ID, brand, etc.)
Context Types based on publisher attributes (e.g., ID, site, content category, etc.)
Context Types based on user attributes (e.g., ID, geography, etc.)
Context Types based on system attributes (e.g., browser, hardware, operating system, etc.)
Context Types based on a combination of Advertiser, Publisher, System, and/or User attributes Example Method for Identification (Operations 802-806 of FIG. 8)

Referring now to FIG. 8, in some implementations, the identification algorithms may use "Map/Reduce" queries to develop "context profiles." These profiles capture the statistical distribution of various metrics (bid rank, bid, bid—clearing price, bid to clearing price correlation, total auctions participated in, total auctions won, bids by advertiser competitors, etc.) for a given advertiser context (e.g. advertiser+brand+publisher site id). Using this information it is possible to classify advertisers according to their bidding characteristics (e.g. high volume and low bidding, low volume and high percentage of wins, etc.). This information can be used to determine which advertisers in a particular context are most likely to be informed and are likely to bid higher than others. It should be recognized that the dynamic pricing systems and methods of the present technology are configured to determine dynamic pricing that is fair for use by both publishers and advertisers. The systems and methods determine fair pricing for the advertiser because the systems and methods of the present technology do not necessarily use historical bid information from a particular advertiser to determine pricing for that advertiser, yet they may use pricing of competitors. The dynamic systems and methods of the present technology are configured to protect the publishers by not allowing advertisers to obtain inventory at lower than fair market value.

Each "context" is associated with a set of statistical features. The features can be divided into three sets including 1) Basic Profiles, 2) Extended Percentile, and 3) Extended Histogram. In some implementations, "Basic Profiles" include, but are not limited to, the following information: statistical information relating to the number of auctions won or lost, the win to loss ratio, various statistical measures based on these, various statistical measures based on the bid price, and other metrics or combinations of metrics derived from auction data.

In some implementations, extended profiles include, but are not limited to, the percentile distributions of various metrics: In some implementations, extended profiles include, but are not limited to, the percentile distributions of various metrics derived from auction data.

Extended Profiles Histogram includes the following information: Extended Profiles Histogram include fine-grained distribution profiles of various metrics or combinations of metrics derived from auction data.

Data analysis operation may be executed on a computational grid, using the data from the auction event store 230 (FIG. 13), as described above. Data analysis operations consist of a series of "map reduce jobs" executed on the computational grid, and a set of scripts for post processing and visualization of data.

The output from this stage is a set of "Context Profiles" that are considered likely candidates for price optimization.

Example Method for Price Determination
(Operations 808-810 of FIG. 8)

During the identification phase, per-advertiser-context profiles are generated. These profiles include information about the advertiser bidding distribution in a given context. This information may be used to determine price floors for every advertiser, so that the probability that an advertiser bids above the floor can be set with a degree of statistical confidence.

Price floors are calculated in a manner that optimizes the expected revenue or other derived metrics given the statistical distribution of the auction derived metrics and metric combinations described above.

Example Method for a Dynamic Market Floor
Auction (Operations 812-814 of FIG. 8)

During a dynamic market floor auction, the RTB market 108 may receive the following information for each bidder:

$$B=[b_i; \text{price}_i; \text{floor}_i]; \text{ for } i \text{ in } 1 \ldots N(1)$$

Where, $b_i$ is the id of the bidder, $\text{price}_i$ is the bid price, $\text{floor}_i$ is the per-bidder floor provided by the dynamic market floor service, and N is the number of bidders.

Figure 9:
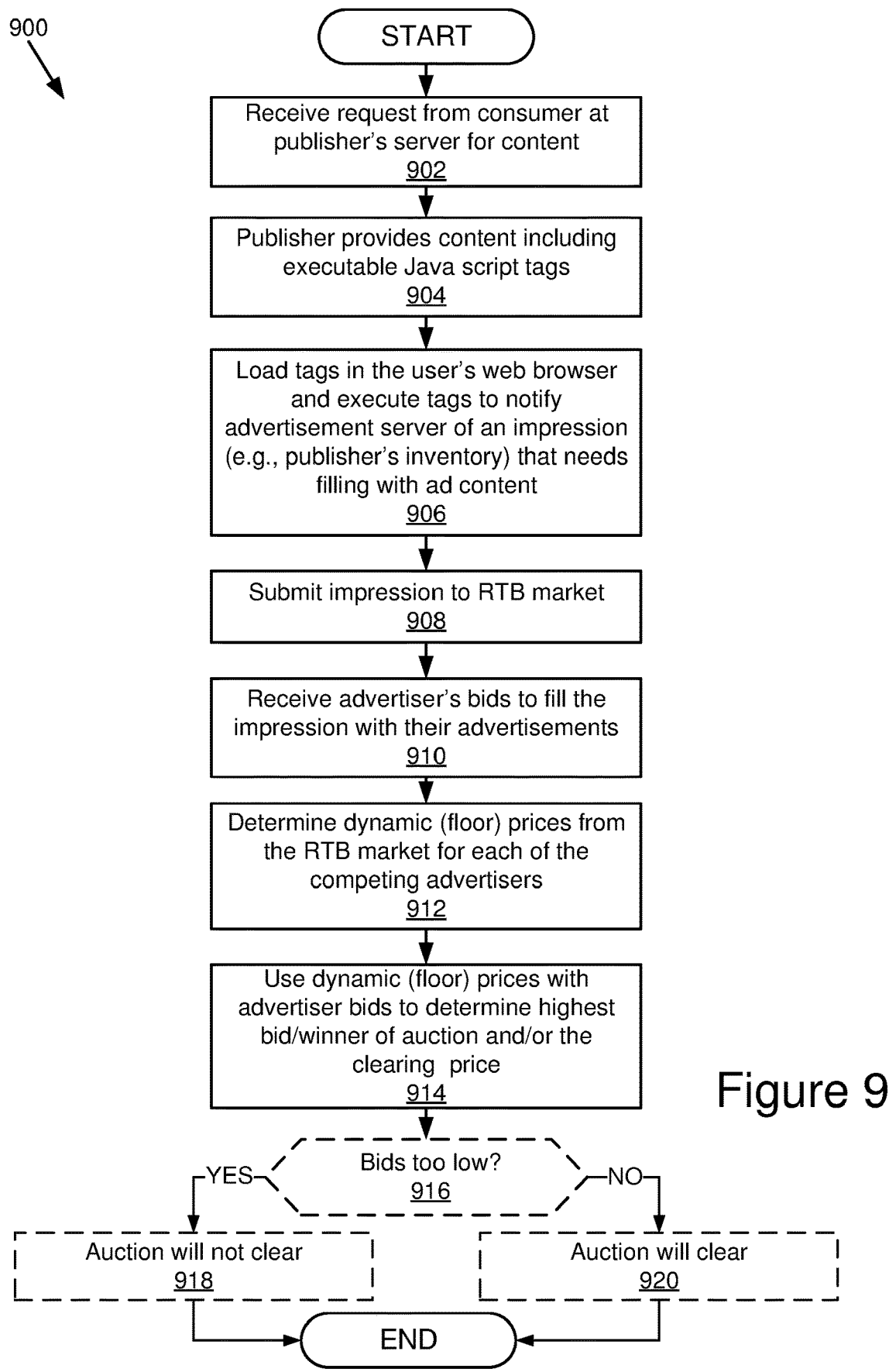
FIG. 9 is a flow chart of an example general method for determining dynamic floor pricing and determining completion or clearance of an auction.

The RTB Market 108 then follows an example algorithm illustrated in FIG. 9 to determine the auction result, clearing price, and an auction winner.

Referring now to FIG. 9, the figure illustrates the operations of the example algorithms as depicted and described above in FIG. 8. The method 900 begins and proceeds to block 902, where one or more operations of the method 900 include receiving requests from consumers (any of the users 125a-125n) at a publisher's server (e.g., online publisher content server(s) 104). The method 900 proceeds to the next block 904, where one or more operations of the method 900 include provision of content by the publisher including executable Java script tags. The method 900 proceeds to the next block 906, where one or more operations of the method 900 include loading the executable tags in the user's web browser and executing the tags to notify an advertisement management server (e.g., 110) of an impression that requires filling. The method 900 proceeds to the next block 908 of one or more operations that include 908 submitting an impression to the RTB market 108. The method 900 proceeds to the next block 910 of one or more operations that include receiving advertiser's bids to fill the impression with their advertisements. The method 900 proceeds to the next block 912 including one or more operations that include determining dynamic prices (in some instances floor prices) from the RTB market for each of the competing advertisers. The method 900 proceeds to the next block 914 including one or more operations that include using dynamic prices (in some instances floor prices) with advertiser bids to determine a highest bid and/or winner of an auction and in some instances the clearing price.

In some implementations, the method 900 proceeds to the next block 916 including one or more operations including determining if the bids are too low. In the event the answer is affirmative, the method 900 proceeds to block 918, where the auction will not clear. In the event the answer in negative, the method 900 proceeds to block 920, where one or more operations indicate that the auction will clear. The operations of blocks 916, 918, and 920 may be implemented in some instances only, therefore they are illustrated with broken lines.

Figure 10:
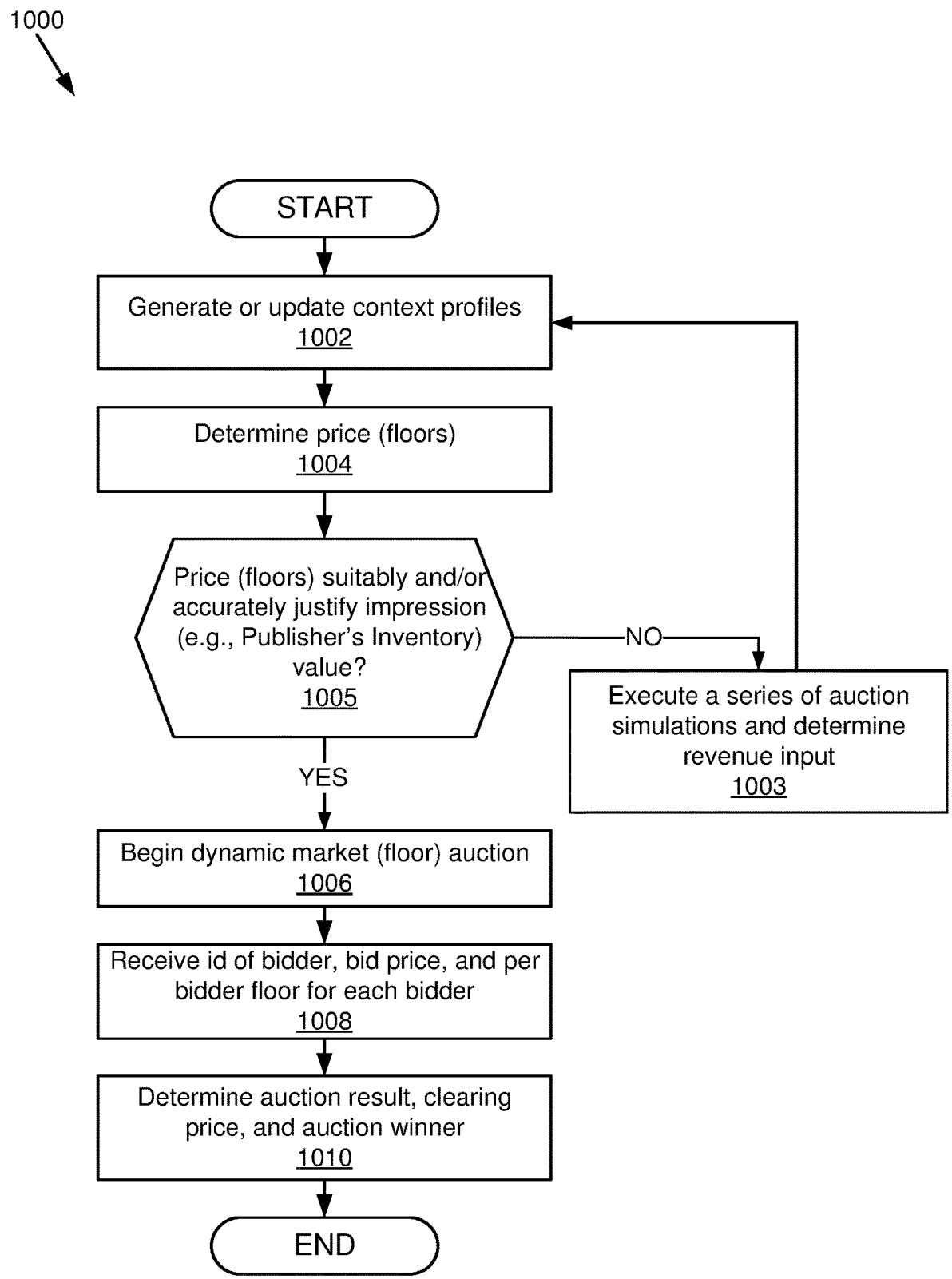
FIG. 10 is a flow chart of an example general method for generating context profiles, determining floor prices and dynamic market floor auctions.

Referring now to FIG. 10, an example method for generating context profiles, determining floor prices and dynamic market floor auctions is described. The method 1000 begins and proceeds to block 1002, which includes one or more operations for generating or updating context profiles. The method 1000 proceeds to block 1004, which includes one or more operations for determining price floors. From there, the method proceeds to a decision block 1005, which determines if a threshold level is met. If the answer is negative, the method 1000 proceeds to the next block 1003 of one or more operations for executing a series of auction simulations and determining revenue input. From there the method 1000 returns to the block 1002, where the method includes one or more operations for generating or updating context profiles. The method 1000 proceeds through blocks 1004 to decision block 1005 and continues with this loop until the threshold is met. Once the threshold is met, the method 1000 proceeds to block 1006, which includes one or more operations for beginning dynamic market floor auctions. The method 1000 proceeds to the next block 1008, which receives one or more operations for receiving an id of a bidder, a bid price, and a per bidder floor for each bidder. The method 1000 proceeds to the next block 1010, which includes one or more operations for determining auction result, clearing price, and auction winner.

Figure 11:
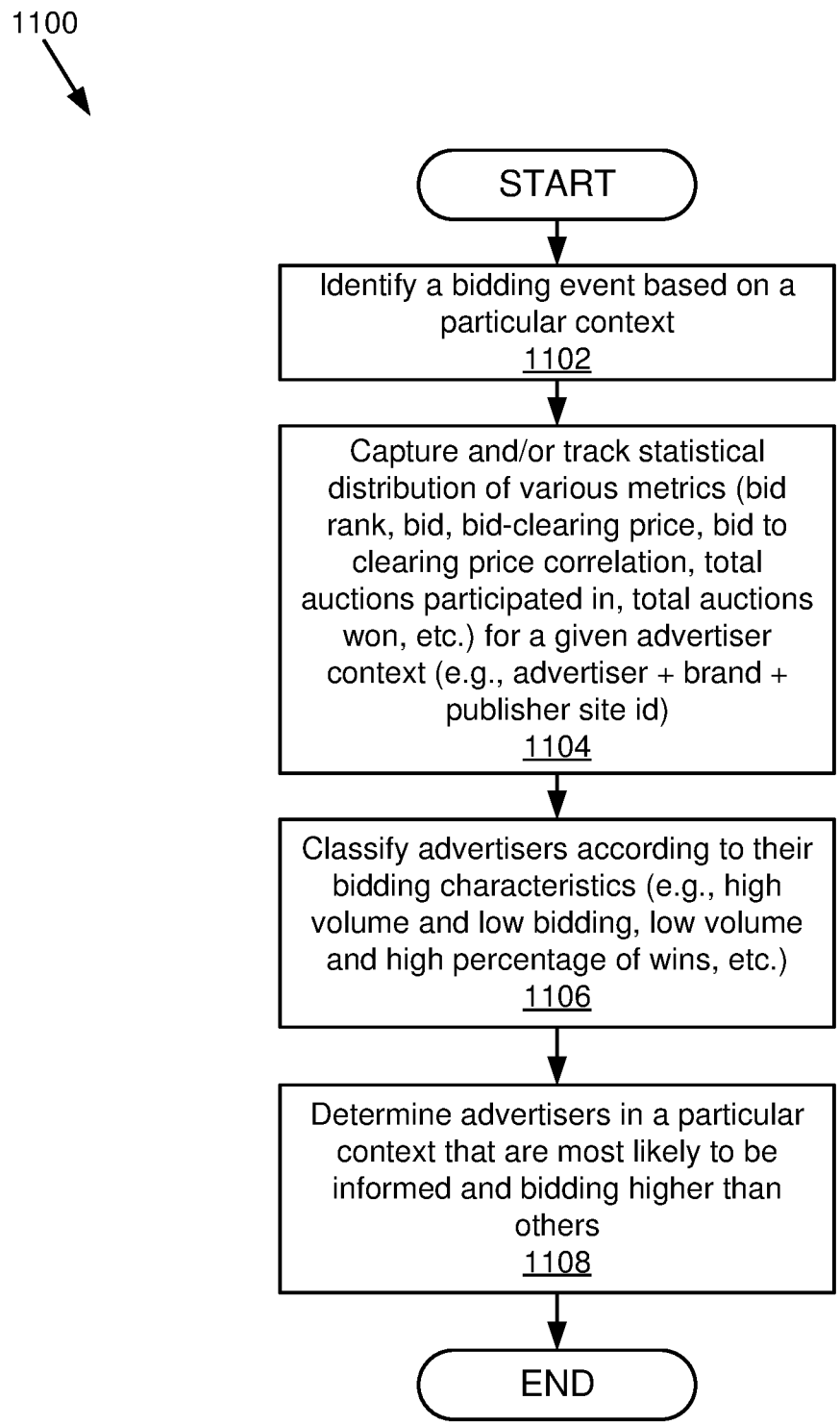
FIG. 11 is a flow chart of an example method for determining advertisers bidding behavior/characteristics in a particular context (operations performed during the identification step performed by the dynamic market pricing system).

Referring now to FIG. 11, an example method for determining advertisers bidding behavior/characteristics in a particular context (operations performed during the identification step performed by the dynamic market pricing system) is described. The method 1100 begins and proceeds to block 1102, which includes one or more operations for identifying a bidding event based on a particular context. The method 1100 proceeds to the next block 1104, which includes one or more operations for capturing and/or tracking statistical distribution of various metrics (e.g., bid rank, bid, bid-clearing price, bid to clearing price correlation, total auctions participated in, total auctions won, etc.) for a given advertiser context (e.g., advertiser+brand+publisher site id). The method 1100 proceeds to the next block 1106, which includes one or more operations for classifying advertisers according to their bidding characteristics (e.g., high volume and low bidding, low volume and high percentage of wins, etc.). The method 1100 proceeds to the next block 1108, which includes one or more operations for determining advertisers in a particular context that are most likely to be informed and bidding higher than others.

Figure 12:
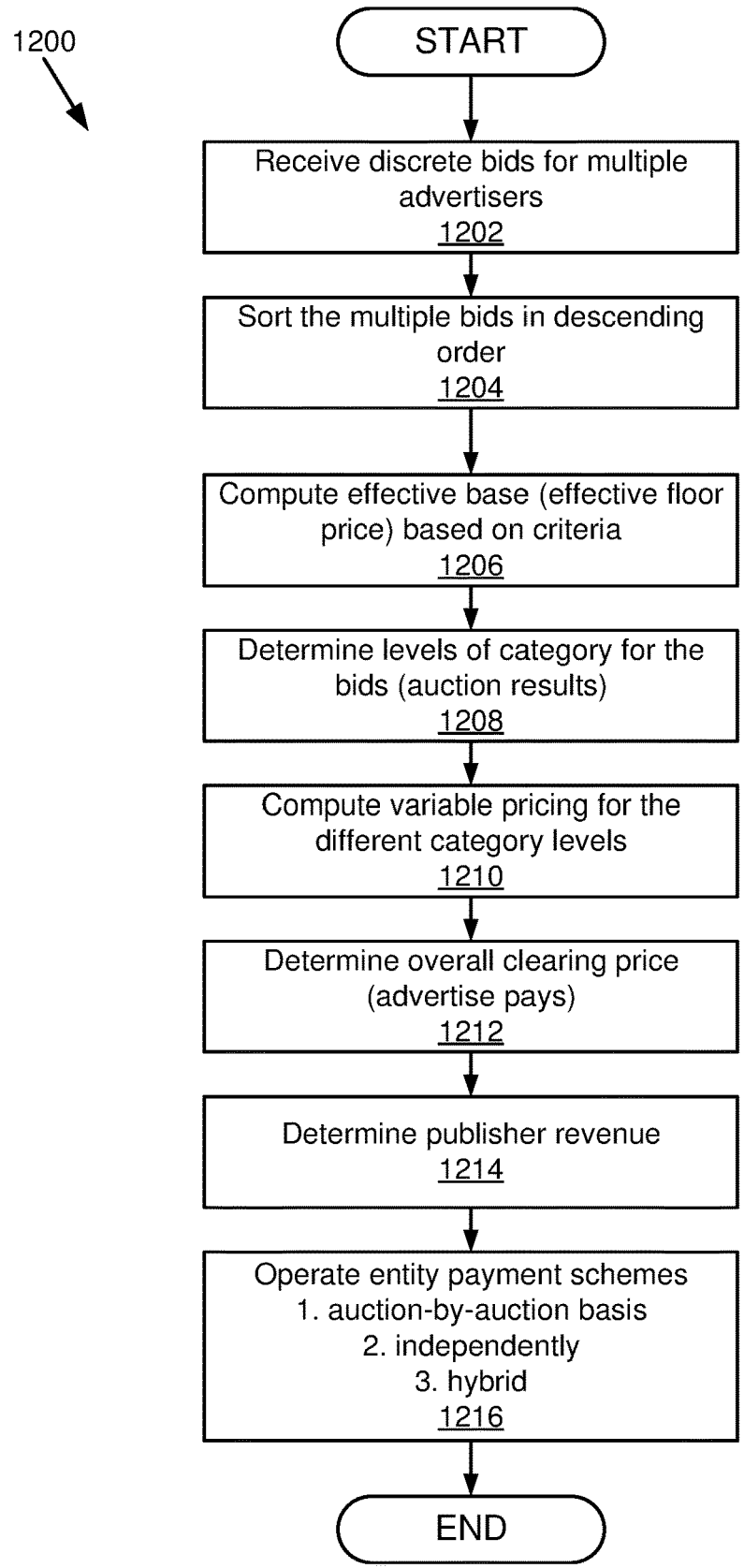
FIG. 12 is a flow chart of an example general method for performing a dynamic floor auction.

Referring now to FIG. 12, an example method for performing a dynamic floor auction is described. The method 1200 begins and proceeds to block 1202 including one or more operations that may include receiving discrete bids for multiple advertisers. The method 1200 proceeds to the next block 1204, where one or more operations of the method 1200 may include sorting the multiple bids in descending order. The method 1200 proceeds to the next block 1206, where one or more operations of the method 1200 may include computing effective floor (effective base price) based on criteria. The method 1200 proceeds to the next block 1208, where one or more operations of the method 1200 may include determining levels of categories for the bids (auction results). The method 1200 proceeds to the next block 1210, where one or more operations may include computing variable pricing for the different category levels. The method 1200 proceeds to the next block 1212, including one or more operations for determining an overall clearing price that is paid by the advertiser. The method 1200 proceeds to the next block 1214, including one or more operations for, determining publisher revenue. The method 1200 proceeds to the next block 1216, which includes one or more operations for operating entity payment schemes, which include either on an auction-by-auction basis, independently, or a hybrid of the two.

It should be understood that the methods 800-1200 are provided by way of example, and numerous variations and/or combinations of these methods, as well as other methods, are contemplated. For example, in some implementations, at least a portion of the methods 800-1200 represent various segments of one or more larger methods and may be concatenated or various steps of these methods may be combined or interchanged to produce other methods which are encompassed by the present invention. Additionally, it should be understood that the methods 800-1200 may be iterative, and thus repeated as many times as necessary to perform the various acts and/or functionalities as discussed in this invention.

Figure 13:
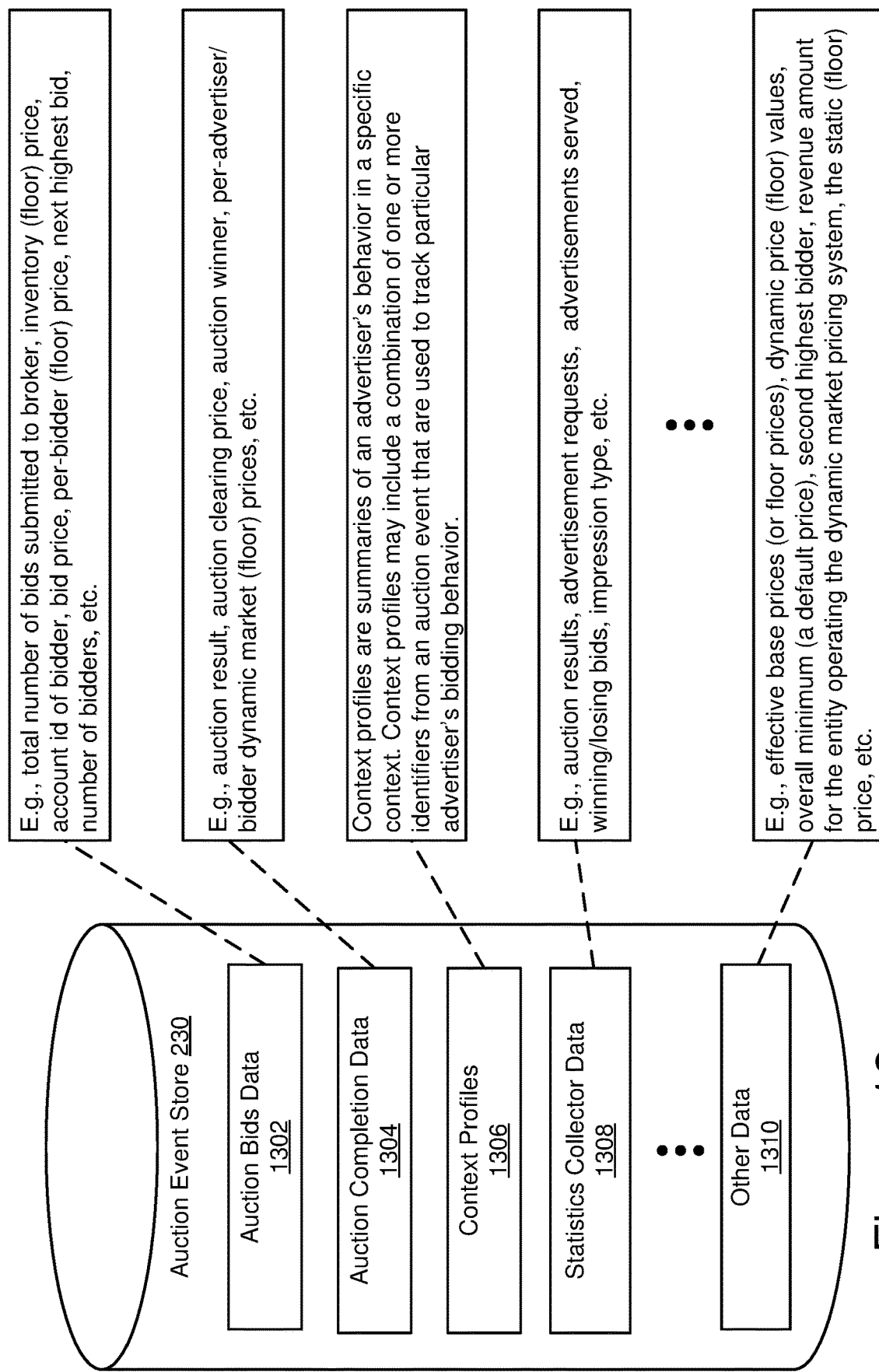
FIG. 13 is a diagram of a data storage illustrating examples of various entities and/or types of data stored in the auction event store.

Referring now to FIG. 13, an example data storage illustrating examples of various entities and/or types of data stored in the auction event store 230 is shown. As illustrated in the figure, the auction event store 230 may include auction bids data, indicated by reference numeral 1302, auction completion data, indicated by reference numeral 1304, context profiles, indicated by reference numeral 1306, statistics collector data, indicated by reference numeral 1308, and possible other types of data, indicated by reference numeral 1310.

The auction bids data 1302 may include, for example, total number of bids submitted to a broker, inventory prices (in some instance floor prices), account id (identification) of a bidder, a bid price, a per-bidder price (in some instances a floor price), a next highest bid, a number of bidders, etc. The auction completion data 1304 may include, for example, an auction result, an auction clearing price, an auction winner, per-advertiser/bidder dynamic market prices (in some instances floor prices), etc. The context profiles 1306 may include context profiles, which are summaries of an advertiser's behavior in a specific context. Context profiles may include a combination of one or more properties from an auction event that is used to track a particular advertiser's bidding behavior. The statistics collector data 1308 may include, for example, auction results, advertisement requests, advertisements served, high/low or winning/losing bids, impression type, etc. The other data 1310 may include, for example, effective base prices (or floor prices), dynamic price values (in some instances floor), overall minimum (a default price), second highest bidder, revenue amount for the entity operating the dynamic market pricing system, the static price (in some instances floor price), etc.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method comprising:
   in a computing device, comprising a data processor coupled to a memory with executable code, the executable code causing said data processor to execute an interface to dynamically signal control actions over a network linked to the data processor via a transceiver, wherein the transceiver is coupled to the network by signal lines, the control actions further comprising:
   identifying a request from a consumer electronic device transmitted via the network at a publisher's server, displaying content within the consumer electronic device via a browser;
   during the display, providing content from the publisher's server to the consumer electronic device, wherein the content has embedded executable instructions in a tag, the tag automatically executing a notification when the content is loaded on the browser;
   notifying a plurality of advertiser platforms over the network of an impression requiring display data in a designated slot within the content loaded on the browser;
   executing real-time bidding event operations for the plurality of advertiser platforms to bid for the designated slot and embed display data in the designated slot within the content;
   receiving a plurality of output bids from the plurality of advertiser platforms;
   designating per-advertiser-context profiles for said advertiser platforms including advertiser distribution information data;
   tracking advertiser behavior data in a given context, said given context based on advertiser attributes including at least data representative of an advertiser identification and an advertiser brand;

tracking input behavior data flow of the plurality of advertiser platforms using one or more of said per-advertiser-context profiles;

generating different context profiles for the plurality of advertiser platforms by selecting all bidding events that match the given context, wherein each context is further associated with a set of statistical features including statistical data on a win-to-loss ratio, data representative of percentile metric distributions derived from real-time market operations, and combinations of metrics derived from data from real-time market operations; and sorting multiple output data received from the plurality of advertiser platforms in a predetermined descending order, by classifying the plurality of advertiser platforms according to a plurality of bidding characteristics including a bidding volume and percentage of wins, and wherein the data processor, classifies the advertiser platforms according to at least one of a high bidding volume level and a low bidding volume level and a high percentage of wins; and selecting a particular advertisement by receiving dynamic data for each of the plurality of advertiser platforms and by storing the dynamic data in an event store coupled to the data processor, wherein the dynamic data includes optimization data used for adaptive responses, and using the dynamic data with the received output bids and a publisher's static floor threshold for determining a highest input data and a clearing threshold associated with the highest input data.

2. The method of claim 1, wherein sorting multiple output data executed via the interface further comprises:
classifying, by the data processor, advertiser input in the bidding characteristics including a high bidding volume level and a high percentage of wins.

3. The method of claim 1, wherein a bid collector is used for sorting the multiple output data, and an input of the bid collector is coupled to a direct bid engine configured to receive the multiple output data from the advertiser platforms, the direct bid engine using an optimization engine configured to adapt to data from the optimization engine for the multiple output data.

4. The method of claim 3, further comprising:
computing, by the data processor, variable value computations for different levels of ef the multiple output data from the advertiser platforms.

5. The method of claim 1, further comprising:
determining, by the data processor, an overall clearing threshold for advertisement placement in the designated slot within the content.

6. The method of claim 1, further comprising:
determining, by the data processor, data representative of publisher revenue amounts.

7. The method of claim 1, further comprising:
computing, by the data processor, an effective base threshold data based on particular established criteria.

8. The method of claim 1, wherein the highest input data is determined to be a winning input.

9. The method of claim 1, wherein the dynamic data for each of the advertiser platforms is determined by considering historical data of the advertiser platforms.

10. An advertisement-placement server system, comprising:
a data processor;
an interface, and a transceiver coupling the interface to an internet connection;
a memory connected to the data processor, the memory storing an executable code causing the data processor to dynamically execute a task for determining a threshold for placement of an advertisement in publisher content displayed on an electronic device over the internet, wherein the executable code includes a tag, the tag automatically executing a notification when the publisher content loads and displays on the electronic device by a browser;
said data processor further coupled by the internet connection to a plurality of advertiser platforms and said data processor notifying the advertiser platforms with a request for an impression, responsive to the notification when the publisher content loads;
said data processor configured to execute real-time bidding event operations for the plurality of advertiser platforms to bid for a designated slot and embed display data in the designated slot within the publisher content;
a dynamic marketing pricing system including a delivery engine, the delivery engine configured to receive the request and optimization data, and processing real-time operations for the impression from advertiser platforms and providing input data to fill the impression with an advertisement, wherein the delivery engine stores the optimization data in an event store coupled to the data processor and the optimization data facilitates adaptive responses;
a bid collector coupled to the dynamic marketing pricing system, the bid collector receiving a plurality of bids from the advertiser platforms to fill the impression with one or more advertisements, the bid collector sorting the plurality of bids in a predetermined descending order, and wherein the data processor, classifies the advertiser platforms according to advertiser input characteristics including at least one of a high bidding volume level, and a low bidding volume level and a high percentage of wins;
the dynamic marketing pricing system coupled to the data processor and the data processor configured to determine dynamic data for the advertiser platforms and use the dynamic data with advertiser input and publisher static floor data to determine a highest input and clearing data for the highest input;
a statistical collector unit coupled to the memory, the statistical collector unit processing statistical data in a plurality of different formats, the statistical data including historical data and static floor data for use in determining pricing data;
said data processor configured to perform a data analysis operation generating a summary of advertiser behavior in relation to a context, wherein the context represents a context type based on advertiser attributes including an advertiser identification and an advertiser brand and at least one from a group of: publisher attributes including a publisher site and content category, user attributes including a user identification and user geography, system attributes including a browser type, hardware, or operating system and a combination of advertiser, publisher, system, and user attributes; and
a selection unit configured to select bidding events that match a given context, wherein said given context is associated with a set of statistical features including statistical data on a win-to-loss ratio, percentile metric distributions derived from real-time operations data, and metric combinations derived from real-time operations data and input events that match a particular context key.

11. The advertisement-placement server system of claim 10, further comprising an instruction that when executed causes the data processor to:
classify the advertiser platforms according to advertiser input characteristics including a high bidding volume level and a high percentage of wins.

12. The advertisement-placement server system of claim 10, wherein the advertiser input from only certain of the advertiser platforms are sorted in a descending order.

13. The advertisement-placement server system of claim 10, further comprising an instruction that when executed causes the data processor to:
compute variable data for different category levels of advertiser input.

14. The advertisement-placement server system of claim 10, further comprising an instruction that when executed causes the data processor to:
determine an overall clearing threshold for placement of the advertisement.

15. The advertisement-placement server system of claim 10, further comprising an instruction that when executed causes the data processor to:
determine publisher revenue amounts.

16. The advertisement-placement server system of claim 10, further comprising an instruction that when executed causes the data processor to:
compute an effective base threshold data based on particular established criteria.

17. The advertisement-placement server system of claim 10, further comprising an instruction that when executed causes the data processor to:
create context profiles for the advertiser platforms; and
track online input behavior of the advertiser platforms using one or more context properties.

18. The advertisement-placement server system of claim 10, wherein the highest input is determined to be a winning input.

19. The advertisement-placement server system of claim 10, wherein the dynamic data for each of the advertiser platforms is determined by considering historical data of competitor advertisers.

* * * * *